United States Patent
Boncek et al.

(10) Patent No.: US 12,553,713 B2
(45) Date of Patent: Feb. 17, 2026

(54) SYSTEM AND METHOD FOR DETECTING AXLE CONFIGURATION ON A MULTI-AXLE VEHICLE

(71) Applicant: Hunter Engineering Company, Bridgeton, MO (US)

(72) Inventors: John M. Boncek, Maryland Heights, MO (US); Timothy A. Strege, Sunset Hills, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 468 days.

(21) Appl. No.: 17/653,430

(22) Filed: Mar. 3, 2022

(65) Prior Publication Data

US 2022/0390226 A1     Dec. 8, 2022

Related U.S. Application Data (60) Provisional application No. 63/166,323, filed on Mar. 26, 2021.

(51) Int. Cl.
*G01B 11/275*     (2006.01)

(52) U.S. Cl.
CPC .... *G01B 11/2755* (2013.01); *G01B 2210/143* (2013.01); *G01B 2210/24* (2013.01); *G01B 2210/26* (2013.01)

(58) Field of Classification Search
CPC .......... G01B 11/2755; G01B 2210/143; G01B 2210/24; G01B 2210/26; G01B 2210/14; G01B 2210/30

(Continued)

(56) References Cited

U.S. PATENT DOCUMENTS 6,304,321 B1 * 10/2001 Wangler .................. G01S 17/89
                                                          356/398
8,804,107 B2     8/2014    Giacomini et al.

(Continued)

FOREIGN PATENT DOCUMENTS

| | | | |
|---|---|---|---|
| CN | 202956278 U | † | 5/2013 |
| EP | 3199912 B1 | † | 5/2022 |
| IN | 361892 | † | 5/2022 |

OTHER PUBLICATIONS

IP.com Online Publication, "Multi-Axle Vehicle Wheel Alignment System", publication No. IPCOM000136159D, May 8, 2006, and available online at http://ip.com/pubView/IPCOM00136159D.

(Continued)

*Primary Examiner* — Anne Marie Antonucci
*Assistant Examiner* — Jodi Jones
(74) *Attorney, Agent, or Firm* — Sandberg Phoenix & von Gontard, PC (57) ABSTRACT

A machine-vision vehicle wheel alignment measurement system configured with at least one optical sensor to acquire images of optical targets disposed within an operative field of view. The system further includes a processing system configured with software instructions to determine relative spatial positions and orientations of one or more optical targets visible within images acquired by the optical sensor. The processing system is further configured with software instructions to automatically identify an axle count and axle configuration for a vehicle undergoing an alignment inspection or service using the determined relative spatial positions and orientations of the visible optical targets.

11 Claims, 6 Drawing Sheets

(58) Field of Classification Search
USPC ... 701/31.4, 34.4, 34.3, 36, 29.1, 33.1, 33.4, 701/31.5, 31.6, 33.2, 33.7, 37, 1, 2, 23, 701/28, 29.9, 30.5, 32.5, 32.9, 33.9, 34.2, 701/42, 43, 69, 81, 82, 89, 29.2

See application file for complete search history.

(56) References Cited

U.S. PATENT DOCUMENTS

| | | | |
|---|---|---|---|
| 9,644,782 B2 | 5/2017 | Linson et al. | |
| 9,778,030 B2* | 10/2017 | McClenahan | G01B 11/2755 |
| 9,791,268 B2 | 10/2017 | Buzzi et al. | |
| 10,480,937 B2† | 11/2019 | Rajupillai | |
| 2008/0170222 A1* | 7/2008 | Strege | G01B 11/2755 356/139.09 |
| 2014/0219509 A1* | 8/2014 | Buzzi | G01B 11/2755 382/104 |
| 2017/0219340 A1* | 8/2017 | Rajupillai | H04N 23/54 |
| 2017/0277952 A1* | 9/2017 | Thommes | G06V 20/56 |

OTHER PUBLICATIONS

Author: Motorindia Title of the publication: Manatec impresses with innovative launches at Automechanika Frankfurt Publication date: Nov. 9, 2016 Publisher: Motorindiamagazine Place of publication: https://www.motorindiaonline.in/manatec-impresses-with-innovative-launches-at-automechanika-frankfurt/.†

Author: NA Title of the publication: Automechanika 2018 Publication date: Sep. 11-15, 2018 Publisher: manatec.in Place of publication: https://manatec.in/automechanika-2018/.†

Author: NA Title of the publication: Sema Show 2019 Publication date: Sep. 5-8, 2019 Publisher: manatec.in Place of publication: https://manatec.in/sema_show_2019/.†

Author : S.Anantharaman Title of the publication : Manatec—30 years of Indian Innovation Publication date : May 18, 2017 Publisher : Motorindiamagazine Place of publication : https://www.motorindiaonline.in/manatec-30-years-of-indian-innovation/.†

Author: Pragati Maidan Title of the publication: Autoexpo 2016 Publication date: Feb. 4-7, 2016 Publisher: manatec.in Place of publication: https://manatec.in/auto-expo-2016/.†

Author: Manatec Electronics Title of the publication: Jumbo 3D Super—Compatible to Cars, Trucks & Buses Publication date: May 10, 2017 Publisher: www.youtube.com Place of publication: https://www.youtube.com/watch?v=wYfp_pnDwRg Pages being submitted : 04.†

Author :Manatec Electronics Title of the publication : Jumbo 3D super-world's 1st 3D wheel alignment for mutli-axle trucks, Buses, trailers Publication date : Oct. 17, 2016 Publisher : www.youtube.com Place of publication : https://www.youtube.com/watch?v=UeZQNaTMD28 Pages being submitted : 06.†

Author: Manatec Electronics Title of the publication: Jumbo 3D Super for wheel alignment of multi axle trucks, buses and trailers using 3D technology Publication date: Sep. 22, 2020 Publisher: facebook.com Place of publication: https://www.facebook.com/photo/?fbid=2671860679703570&set=a.2671861693036802 Page being submitted : 01.†

\* cited by examiner
† cited by third party

FIGURE 5

Vehicle Centerline

SYSTEM AND METHOD FOR DETECTING AXLE CONFIGURATION ON A MULTI-AXLE VEHICLE

CROSS-REFERENCE TO RELATED APPLICATIONS

The present application is related to, and claims priority from, co-pending U.S. Provisional Patent Application Ser. No. 63/166,323 filed on Mar. 26, 2021, and which is herein incorporated by reference.

STATEMENT REGARDING FEDERALLY SPONSORED RESEARCH

Not Applicable.

BACKGROUND OF THE INVENTION

The present application is related generally to the measurement of wheel alignment on a motor vehicle, and in particular, to methods and apparatus to automatically determine the number of axles present on a vehicle undergoing an alignment service or inspection.

Figures 1, 2:
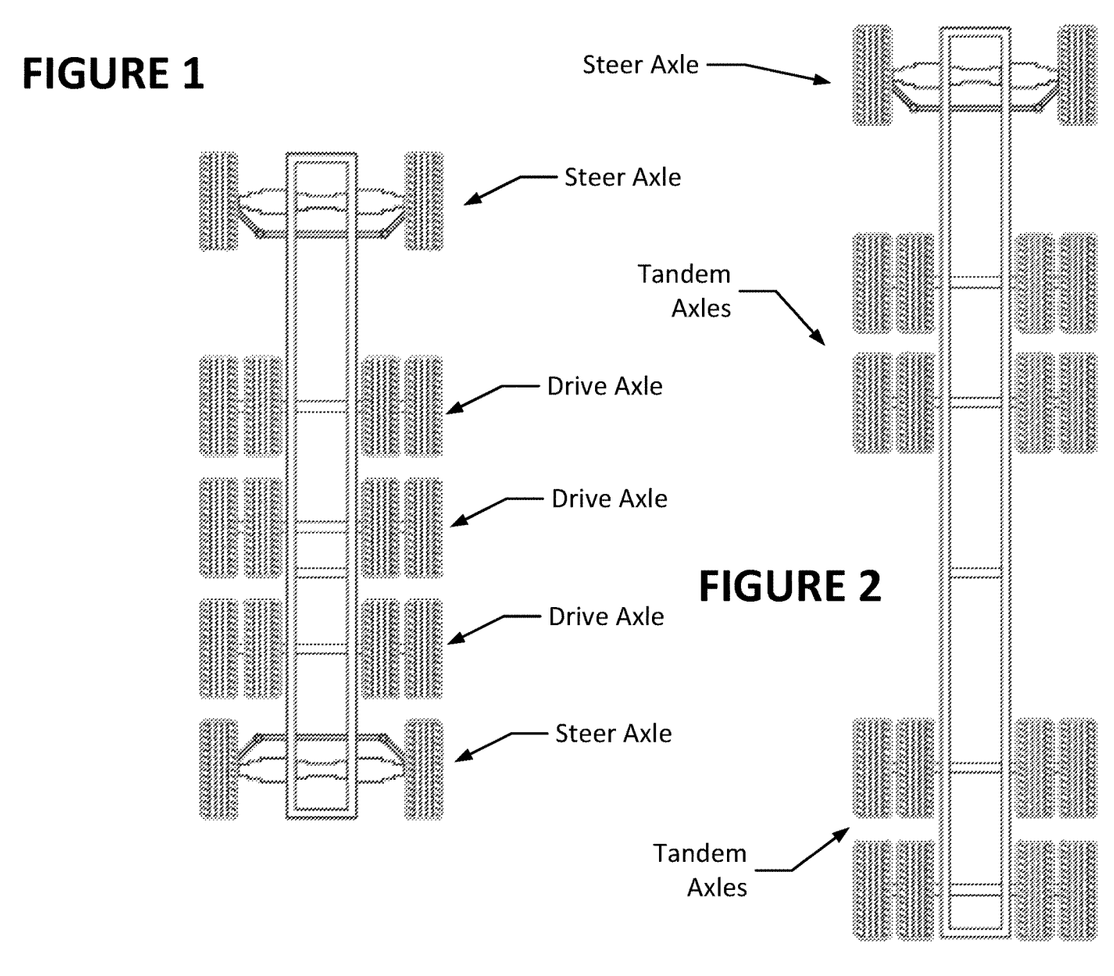
FIGS. 1-4 are representations of exemplary axle configurations for heavy-duty vehicles including steer axles, drive axles, and tandem axles.
Figure 3:
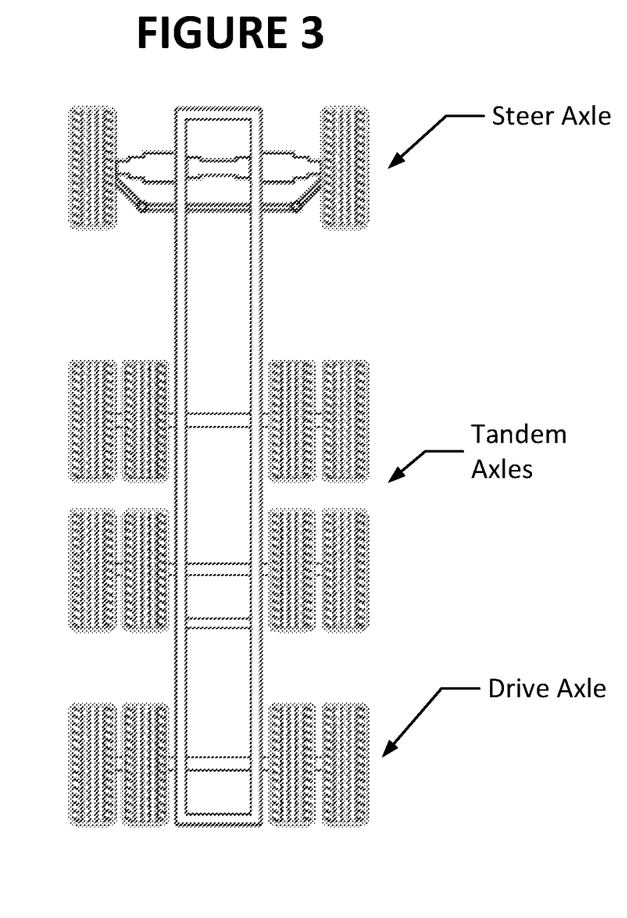
Figure 4:
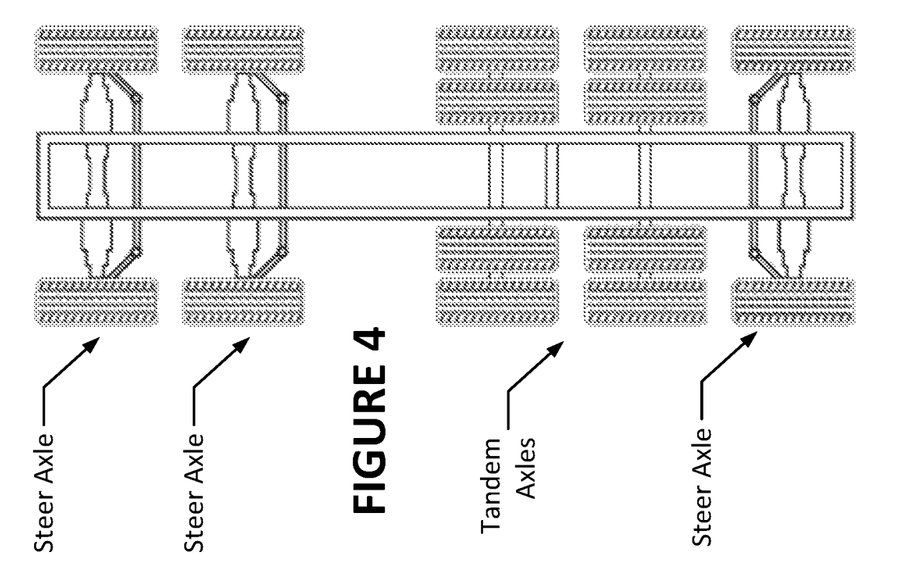

During a vehicle wheel alignment inspection or service, it is often necessary to determine a count of, and the configuration of, the axles present on the vehicle. While passenger vehicles such as sedans or light trucks almost universally have two axles, consisting of one steer axle and one non-steer axle, heavy-duty vehicles such as busses, tractors, utility tracks, etc. have a wide variety of axle counts and configurations. Heavy-duty vehicle axle configurations may include multiple steer axles and multiple rear or tandem axles having varied spacing such as shown in FIGS. 1-3. For example, a typical tractor (the motive portion of a tractor-trailer combination) may include a single drive axle, a pair of non-steer tandem axles, and one or more trailer axles. Heavy-duty vehicles, such as recovery vehicles, mobile cranes, and large cement trucks, may include multiple steer axles and two or more tandem axles, such as shown in FIG. 4 depending upon the intended load the vehicle is designed to handle.

One example of a heavy-duty vehicle wheel alignment measurement system can be found in U.S. Pat. No. 9,778,030 B2 to McClenahan et al., herein incorporated by reference, which requires a heavy-duty vehicle undergoing measurement or inspection to remain stationary, and for optical targets or sensors to be secured to the outermost wheels on each axle. Measurements are acquired by observation of the optical targets using multiple cameras, or directly from the wheel mounted sensors, facilitating calculations of wheel alignments and axle orientations. Additional examples of multi-axle optical measurement systems for stationary heavy-duty vehicles can be found in U.S. Pat. No. 9,791,268 B2 to Buzzi et al., in U.S. Pat. No. 8,804,107 B2 to Giacomini et al., and in the IP.com publication No. IPCOM000136159D, entitled "Multi-Axle Heavy-Duty Vehicle Wheel Alignment System".

In order to properly inspect and/or perform adjustments to the alignment of the wheels on such vehicles, it is necessary for an operator to manually identify both an axle count and an axle configuration. Identification of the axle count and axle configuration enables a vehicle alignment inspection or service system to provide an operator with the correct procedures for obtaining axle and wheel alignment measurements for the vehicle. The manual process requires the operator to observe the vehicle, and to select a match from a set of vehicle configuration choices presented on a graphical user interface. Due to the numerous variations possible for heavy-duty vehicle axle arrangements, this process may be time consuming, requiring the operator to review multiple options to find the correct choice. Furthermore, it is possible that the specific configuration of the vehicle undergoing inspection or service is not available within the choices presented to the operator, thereby requiring the operator to carry out additional steps to custom-configure the vehicle alignment inspection or service system before performing the inspection or service.

Accordingly, it would be advantageous to configure a vehicle wheel alignment measurement and/or inspection system with a method for automatically identifying a vehicle's axle count and axle configuration. It would be further advantageous to enable the system to accommodate a wide range of axle counts and axle configurations without the need for operator intervention and/or custom configuration prior to conducting a vehicle wheel alignment service or inspection.

BRIEF SUMMARY OF THE INVENTION

Briefly stated, the present invention sets forth a machine-vision vehicle wheel alignment measurement system configured with at least one optical sensor to acquire images of optical targets disposed on vehicle wheels within an operative field of view. The system includes a processing system configured with software instructions to determine relative spatial positions and orientations of one or more optical targets visible within images acquired by the optical sensor. The processing system is further configured with software instructions to automatically identify an axle count and an axle configuration or spacing for a vehicle undergoing an alignment inspection or service using the determined relative spatial positions and orientations of the visible optical targets on the vehicle wheels.

In one embodiment, the machine-vision vehicle wheel alignment measurement system is configured with at least two optical sensors. A first optical sensor is configured to observe wheel-mounted optical targets disposed on the left-side outermost wheels of each axle on a vehicle undergoing measurement, and a second optical sensor is configured to observe wheel-mounted optical target disposed on the right-side outermost wheels of each axle of the vehicle. The processing system is configured with software instructions to count the observed targets located along each lateral side of the vehicle, and to determine a relative range to each target, from which an axle count and an axle configuration or spacing for the vehicle is established and presented to the operator, such as via a graphical user interface.

In a further embodiment of the present disclosure the processing system is configured with software instructions to receive, from the operator, input identifying specific axle characteristics for a vehicle following a presentation of an axle count and axle configuration or spacing on a graphical user interface. Specific axle characteristics may include one or more of: an identification of at least one steer axle; an identification of at least one drive axle; an identification of tandem axle pairs; a designation of trailer axles; or a selection of a reference axle for the vehicle and/or trailer.

In another embodiment, the machine-vision vehicle wheel alignment measurement system includes a supplemental distance measurement sensor, such as a time-of-flight optical sensor, configured to measure a relative range to each observed optical target.

As a method, the present disclosure determines a vehicle's axle count and axle configuration using a machine-vision vehicle wheel alignment measurement system. Optical targets are mounted to the outermost wheels on each axle of a stationary vehicle positioned within the field of view of the machine-vision vehicle wheel alignment measurement system. Images of the mounted optical targets are acquired by a set of imaging sensors, and are evaluated to identify a relative range to each visible optical target. Pairs of optical targets on opposite lateral sides of the vehicle which have measured ranges within an established tolerance of each other are identified as mounted to the outermost wheels of a common axle. A count of the common axles on the vehicle is established from the number of identified optical target pairs. Evaluating a relative position and longitudinal spacing between each identified axle establishes the vehicle axle configuration as including at least one steer axle, at least one non-steer axle, and the presence of any additional rear or tandem axles on the vehicle. Vehicle wheel alignment measurement and inspection procedures are subsequently selected in accordance with the established vehicle axle count and axle configuration.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

As used herein, the term heavy-duty vehicle is intended to define any vehicle or combination of vehicle and attached trailer, configured with three or more axles, including at least one steer axle and at least one drive axle. Additional axles may include, but are not limited to, steering axles, drive axles, pusher axles, tag axles, and trailer axles. Axles may be configured with single wheel assemblies at each end, dual wheel assemblies, or super-single wheel assemblies without departing from the intended scope of a heavy-duty vehicle. The term heavy-duty vehicle is not intended to limit the scope of vehicles, or combination of vehicles and attached trailers, by either weight or size. As used herein, the term trailer refers to a vehicle configured to be towed by a driven vehicle such as by a heavy-duty vehicle, and which includes one or more axles. A trailer may be coupled to a tow vehicle, or may be parked in an uncoupled configuration. Unless specifically distinguished here, the term vehicle shall be used to generically refer to any type of vehicle undergoing service or inspection, including, without limitation, heavy-duty vehicles with and without trailers, stand-alone trailers, and articulated vehicles.

Figure 5:
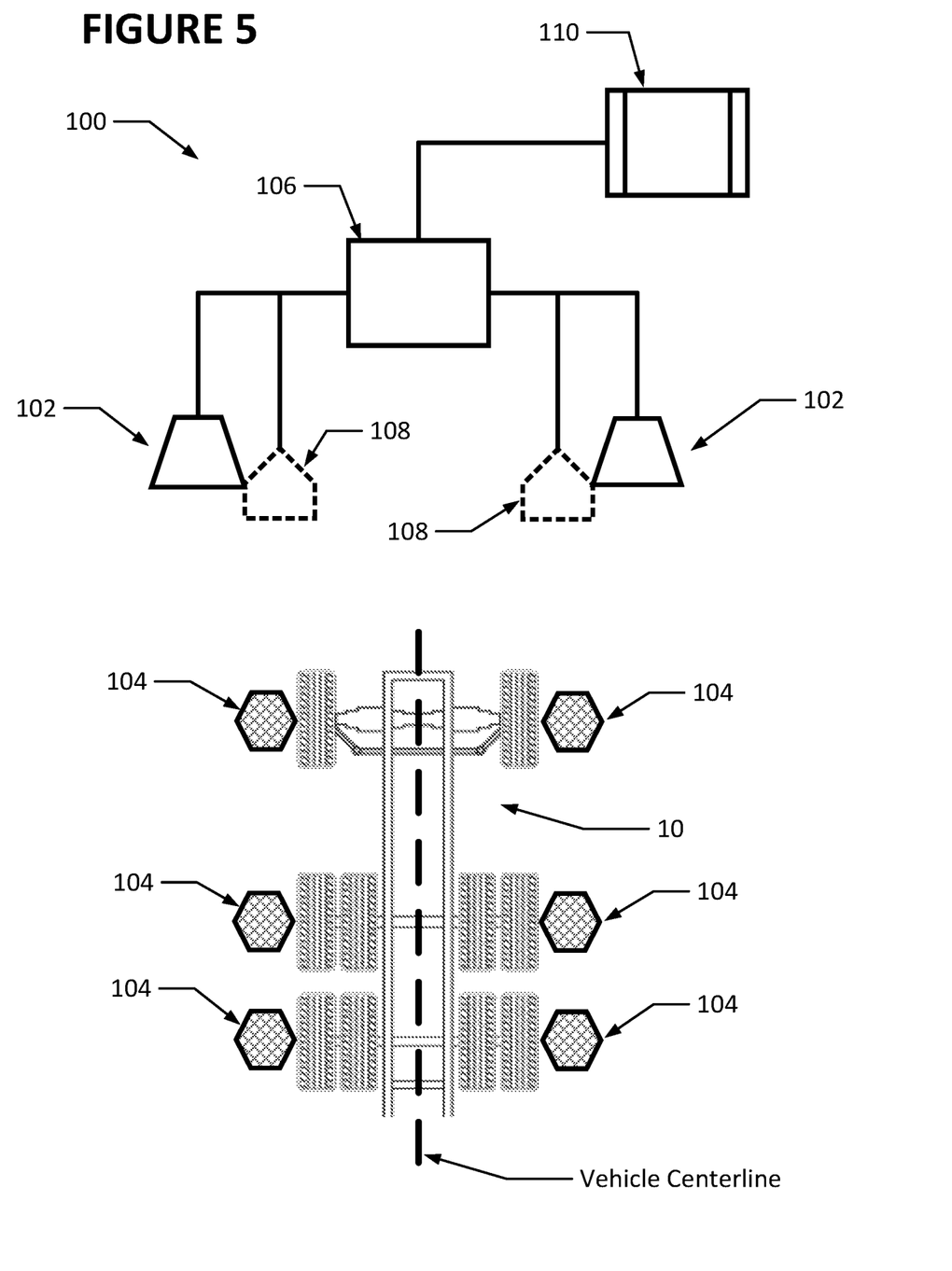
FIG. 5 is a representation of the basic components of a machine vision vehicle wheel alignment measurement or inspection system.

A machine-vision vehicle wheel alignment measurement system 100 for use in a vehicle service environment is generally configured with a plurality of optical sensors 102 in form of imaging modules or cameras. These optical sensors 102 are oriented to capture images of wheel assemblies and/or optical targets 104 disposed thereon within an operative field of view encompassing a stationary vehicle 10 positioned to undergo a wheel alignment service or inspection. In order to capture images of wheel assemblies and/or optical targets 104 disposed on the left and right sides of the vehicle 10, the optical sensors 102 can be disposed at opposite lateral ends of a vertically-adjustable horizontal camera boom carried by a support fixture positioned at the front end of a vehicle service area, such as seen in FIG. 5 and shown in U.S. Pat. No. 9,644,782 B2 to Linson et al. Alternatively, the optical sensors 102 may be mounted on independent support structures located around the vehicle service area as seen in U.S. Pat. No. 9,778,030 B2 to McClenahan et al. With appropriate reference frame calibration, multiple optical sensors 102, configured to observe different regions of the vehicle service area, may be provided, enabling the system to acquire images of front wheel assemblies and/or optical targets 104 disposed on the front wheels of the vehicle 10 within the service area, as well as rear and trailer wheel assemblies and/or optical targets 104 disposed on either the rear wheels or on the wheels of an attached trailer. Additional optical targets within the operative field of view of the optical sensors 102 may include, but are not limited to, targets mounted relative to the vehicle's frame or body, or to a trailer frame, hitch, or king-pin coupling.

A processor 106 associated with the machine-vision vehicle wheel alignment measurement system is configured to direct the optical sensors 102 to acquire optical data and/or images and convey them to the processor 106 or other another suitably configured processing system for evaluation via a communication interface. The optical data and/or images are evaluated to determine relative spatial positions and orientations of either the observed wheel assemblies or optical targets within a common frame of reference using known techniques for image processing and vehicle wheel alignment measurement procedures. The processing system 106 is further configured to use the evaluated images to identify an axle count and an axle spacing for the vehicle 10.

Additional vehicle parameters, such as position, reference orientation, and wheel alignment angles may be identifiable from the determined spatial positions and orientations of the observed wheel assemblies or optical targets 104 using well understood distance measurement procedures.

In one embodiment, the processor 106 or processing system is configured with software instructions to count the observed wheel assemblies and/or optical targets 104 located along each lateral side of the vehicle 10, and to determine a relative range to each wheel assembly and/or optical target 104 from the observing sensor. Relative ranges can be established either through analysis of features on the wheel assemblies and/or optical targets 104 (i.e. observed sizes), or by measurements acquired from supplemental distance measurement sensors 108, such laser range finders or time-of-flight optical sensors located in known proximity to the optical sensors 102, which are conveyed to the processor 106 or processing system. Optical targets 104 which are not associated with vehicle axles, such as those mounted to opposite ends of support frames or reference bars used to identify a vehicle's frame orientation or trailer kingpin location, as shown in U.S. Pat. No. 9,778,030 B2 to McClenahan et al., may be excluded during axle counting procedures, either manually by an operator, or automatically in response to specifically selected procedures or the use of identifying markings on the optical targets 104. For example, during procedures in which a vehicle frame orientation is required, the processor 106 or processing system is configured to automatically designate the forwardmost pair (and/or rearmost pair) of observed optical targets 104 as being mounted on a support referenced to the vehicle's frame structure, and exclude those optical targets from being designated as on an axle.

Figure 6:
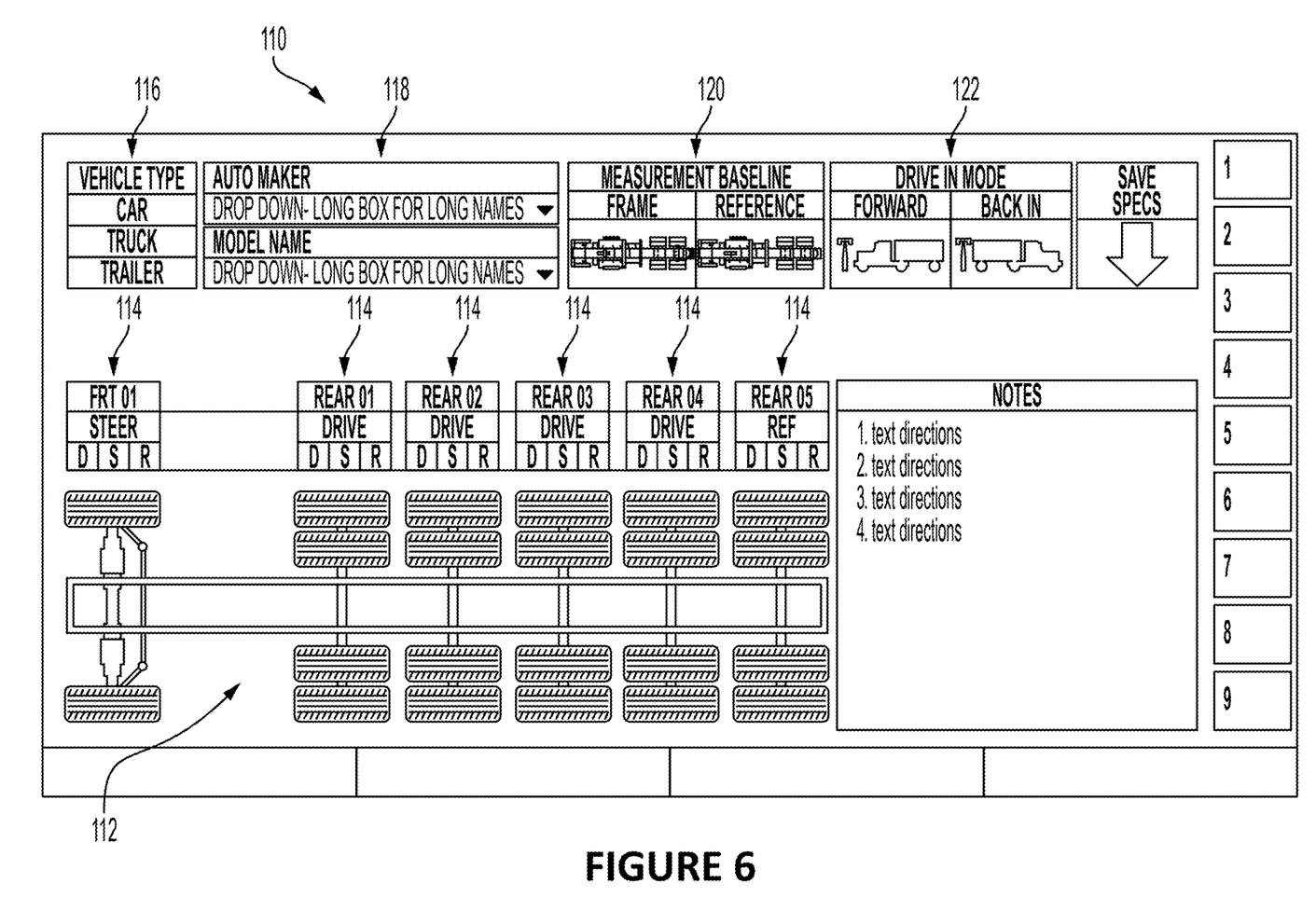
FIG. 6 is an illustration of an exemplary graphical user interface for selecting axle designations associated with multiple axles on a vehicle.

Using the observed wheel assemblies and/or optical targets 104, together with the determined relative ranges, an axle count and an axle spacing for the vehicle 10 is established by the processor 106 or processing system. The number of axles on the vehicle is established by identifying observed wheel assemblies and/or optical targets 104 on opposite sides of the vehicle's longitudinal centerline, having relative ranges which are within an acceptable tolerance of each other (i.e., wheel assemblies and/or optical targets 104 which are laterally opposite from each other along the longitudinal length of the vehicle 10). Spacing between individual axles is established from the relative ranges to the observed wheel assemblies and/or optical targets 104 on one lateral side of the vehicle 10. Using the determined axle count and axle spacing, a suitable vehicle wheel alignment measurement and inspection procedure is selected by the processor 106 or processing system and presented to the operator via a graphical user interface 110 or alternative display, such as shown in FIG. 6. The graphical user interface can be configured in a variety of layouts, and may include options for selection of the vehicle type (car, truck, trailer, articulated, etc.), vehicle make and model, measurement baseline (vehicle frame reference, axle reference), and vehicle orientation within the service area (forward-facing, backed-in).

For some vehicles, it may be necessary to identify the specific configuration of the vehicle and the vehicle axles before the processing system can complete a measurement and inspection procedure. A representation 112 of the axle count and individual axle spacing can optionally be presented to an operator via the graphical user interface 110, such as seen in FIG. 6, together with interface options enabling the operator to identify the vehicle and to provide labels or identifying details for one or more of the individual axles. Axle labels or detail information may include designating individual axles as one of at least a drive axle "D", a steer axle "S", or a reference axle "R" against which other axles may be measured or aligned. Typically, at least one axle will be designated as a reference axle "R". Additional axle designations, such as a rear axle, a tandem axle pair, or a trailer axle may be utilized. Through the graphical user interface 110, the operator is presented with selection options 114, such as buttons or a drop-down menus of available axle labels or identifications, adjacent a display of each located axle on a vehicle. The selection options 114 enable the operator to easily establish or change an axle label or designation for use during the measurement or inspection process. The graphical user interface 110 may provide additional options such as a means to exclude an axle from measurement and inspection, or a means to set default labels or designations for specific axle positions. Interactive elements for designating the type of vehicle (116), selecting a vehicle make and model (118), choosing a type of measurement baseline (120), and indicating the positioning of the vehicle (122) relative to the measurement system 100 may be presented to the operator in the graphical user interface 110.

In the event the number of axles on the vehicle exceeds the number of available wheel-mounted optical targets, the operator may be directed, through the graphical user interface, to associate the optical targets with different sets of axles during the axle identification process, enabling the processing system to combine data from each set of axles in order capture a complete overview of the vehicle's total axle count and axle spacing configuration. For example, on a vehicle having more than three axles, an initial set of axles to be measured may consists of the forward-most three axles. After the count and range to each of the initial axles is established, the optical targets are moved to a next rearwards set of three (or fewer) remaining axles, and the count and range process repeated. The total axle count is updated by combining the current axle count with the latest count of axles, and the process is repeated until all axles on the vehicle have been measured.

Similarly, in the event one or more of the vehicle's axles is outside of the field of the view the optical sensors, the operator may be directed, through the graphical user interface, to reposition the optical sensors within the vehicle service area to enable observation of the additional wheel assemblies and/or optical targets, enabling the processing system to capture a complete overview of the vehicle's axle count and axle configuration.

Figure 7:
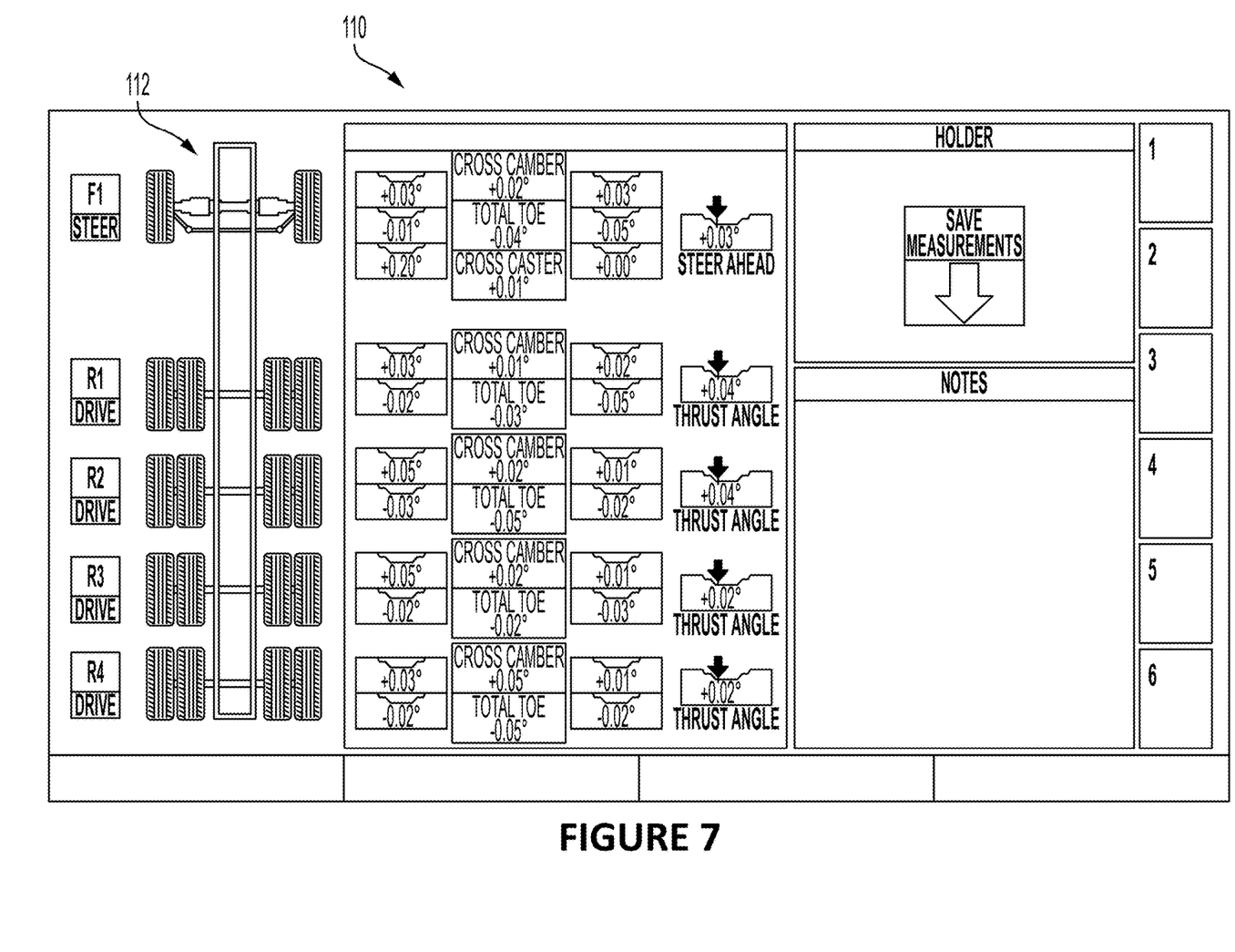
FIG. 7 is an illustration of an exemplary graphical user interface for displaying measurements associated with multiple axles on a vehicle.

Following axle identification, the processor 106 or processing system is configured to select an appropriate vehicle measurement and inspection procedure for presentation to the operator, enabling the vehicle service to proceed in a conventional manner. Measurement results associated with each measured axle, or the individual wheels of the axles, can be displayed in the graphical user interface, such as shown in exemplary FIG. 7.

Figure 8:
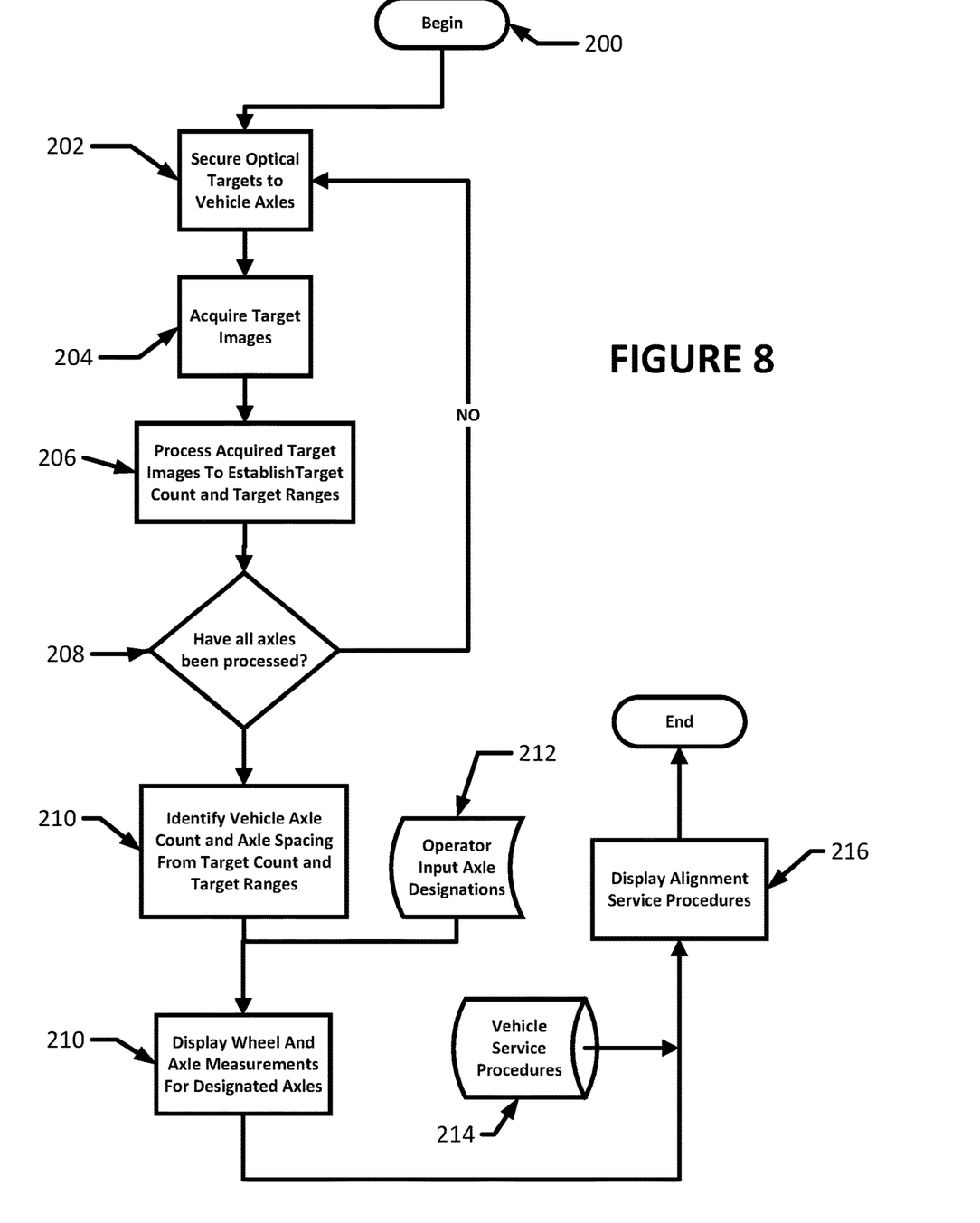
FIG. 8 is a flow chart illustrating steps in a method of the present disclosure for identifying an axle configuration for a vehicle.

In a further embodiment illustrated in FIG. 8, the present disclosure sets out a method for determining a vehicle axle configuration using a machine-vision vehicle wheel alignment measurement system. The process begins (200) when a vehicle undergoing a measurement or service procedures is parked within a vehicle service area observable by a set of optical imaging sensors. Available optical targets are secured to the vehicle (Box 202) at the outermost wheel assembly on the axles of the vehicle, and to any required vehicle reference points, for imaging by the set of optical imaging sensors. Images of the optical targets are acquired (Box 204)

and are processed (Box 206) to establish a count of visible wheel-mounted optical targets on each lateral side of the vehicle. The location of each visible optical target within a common frame of reference is identified, either as a range or distance from a common reference point, or as a spatial coordinate location, from which the longitudinal spacing between visible optical targets along at least one lateral side of the vehicle is identified. In the event the number of axles on the vehicle exceeds the maximum number which can be measured at one time by the system, leaving processed axles (Box 208), the available optical targets are repositioned onto the outermost wheel assemblies of additional axles, and the count and location procedures repeated until images for each axle have been processed. Using the total count of visible optical targets, and/or the relative longitudinal positioning of the optical targets along one side of the vehicle, an identification of the vehicle's axle count and spacing is established (Box 210), starting with a steer axle closest to the front of the vehicle and concluding with a rearmost axle.

Operator input is received via a suitable interface to provide axle labels or designations for each identified axle (Box 212). Axles may be designated as steer axles, drive axles, a reference axle, rear axles, or as trailer axles. Alternatively, observed longitudinal displacement between adjacent axles is utilized to automatically distinguish between single axles, rear axles, and trailer axles. For example, vehicles configured with dual-steer axles may be automatically identified by the longitudinal displacement between the first and second forwardmost axles, or by operator input. Similarly, vehicles with towed trailers may be identified by the longitudinal displacement between rearward individual axles or tandem axle pairs. Once the axles are labeled or designated, wheel and axle measurements are displayed, and a set of procedures for vehicle alignment services corresponding to the identified vehicle configuration are recalled from a database (Box 214) and are presented to an operator (Box 216), in a conventional manner such as through the graphical user interface, enabling the operator to carry out any necessary vehicle adjustment or inspection procedures.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for configuring a vehicle wheel alignment measurement system, having a set of optical imaging sensors operatively coupled to a processor, to provide an operator with a vehicle-specific set of wheel alignment measurement and/or adjustment procedures for a vehicle having three or more axles, each axle having at least an outermost wheel assembly at opposite ends, comprising:
   positioning said vehicle within a vehicle service area observable by said set of optical imaging sensors;
   securing, along at least one lateral side of said vehicle, an optical target to the outermost wheel assembly on each axle;
   operating said set of optical imaging sensors to acquire at least one image of each secured optical target;
   determining, from said acquired images, a range measurement associated with each optical target;
   identifying pairs of optical targets on opposite lateral sides of said vehicle having determined ranges which are within acceptable tolerances of each other, wherein each identified pair of optical targets is defines an individual axle in a count of individual axles for said vehicle;
   identifying an axle spacing between said defined individual axles on said vehicle using said determined range measurements for each axle-associated optical target located along one lateral side of said vehicle;
   generating a representation of said defined individual axles and said identified axle spacing for said vehicle;
   selecting from a database said set of vehicle wheel alignment measurement and/or adjustment procedures for said vehicle based on said individual axle count and said axle spacing; and
   guiding an operator to complete said alignment measurement and/or adjustment procedure by presenting said representation on a graphical user interface together with said selected set of measurement and/or adjustment procedures.

2. The method of claim 1 further including receiving operator input, via said graphical user interface, identifying one or more of said defined individual axles as one of a steer axle, a non-steer axle, drive axle, a reference axle, or a tandem axle.

3. The method of claim 2 wherein selecting said set of vehicle wheel alignment measurement and/or inspection procedures is further in response to said received axle identification.

4. The method of claim 2 wherein said received axle identification indicates a presence or an absence of a towed trailer.

5. The method of claim 2 wherein said received axle identification identifies a presence of a second steer axle on a dual-steer vehicle.

6. The method of claim 1 wherein said ranges to said optical targets from at least one reference point in a common frame of reference are established by evaluating, for each optical target, a spatial position of at least one feature of said optical target within said acquired images.

7. The method of claim 1 wherein said ranges to said optical targets are established by directly measuring distances from one or more selected reference points to one or more reference points on each of said optical targets.

8. A vehicle wheel alignment service system, comprising:
   a set of optical imaging sensors, said optical imaging sensors disposed within a vehicle service area to capture images of optical targets mounted to a set of wheels on at least three axles of a vehicle undergoing a wheel alignment service;

a processing system operatively coupled to said optical imaging sensors to receive image data therefrom, said processing system configured with software instructions to acquire images of said visible optical targets secured to wheels on at least one lateral side of said vehicle;

evaluate said acquired images to determine a range between each of said visible optical targets and one or more reference points within a common frame of reference;

determine relative axle spacing for said vehicle axles from said determined ranges;

present a representation of said axles on a graphical user interface, said representation including an indication of said determined relative axle spacing;

receive through said graphical user interface operator input designating one or more axles of said vehicle as a steer axle, a non-steer axle, a drive axle, a reference axle, a rear axle, a tandem axle, or a trailer axle;

select a vehicle wheel alignment service or inspection procedure in response to said determined relative spacing and said received operator input; and wherein said processing system is further configured with software instructions to conduct said selected vehicle alignment service or inspection procedure using said graphical user interface to provide operator guidance.

9. A method for configuring a vehicle wheel alignment measurement or inspection system to conduct a vehicle wheel alignment measurement and/or adjustment procedure for a vehicle having at least three axles, comprising:

positioning said vehicle within a vehicle service area observable by a set of optical imaging sensors;

securing an optical target to an outermost wheel assembly on at least one lateral side of said vehicle for each axle in an initial set of said axles;

acquiring at least one image of each secured optical target from said set of optical imaging sensors;

processing said acquired images to determine a range measurement associated with each of said secured optical targets;

incrementing a set of measured axles on said vehicle by determining axle spacing between adjacent axles based on said measured ranges to each of said secured optical targets;

removing said optical targets from at least one axle in said measured set of axles and repositioning said removed optical targets onto an outermost wheel assembly on said at least one lateral side of at least one unmeasured axle on said vehicle;

utilizing said at least one repositioned optical target to repeat said steps of acquiring, processing, and incrementing said set of measured axles;

repeating said steps of removing, repositioning, and utilizing until all axles of said vehicle are measured;

selecting a vehicle wheel alignment measurement and/or adjustment procedure for said vehicle in response to a total number of axles in said set of measured axles and to said determined axle spacing for said measured axles;

guiding an operator to complete said selected vehicle alignment measurement and/or adjustment procedure by presenting a representation of said measured axles on a graphical user interface together with said selected set of vehicle wheel alignment measurement and/or adjustment procedures.

10. The method of claim 9 further including receiving, via said graphical user interface, an axle identification for each measured axle as one of a steer axle, a non-steer axle, drive axle, a reference axle, or a tandem axle.

11. The method of claim 10 wherein selecting said vehicle wheel alignment measurement and/or inspection procedure for presentation on said graphical user interface is further in response to said received axle identifications.

* * * * *